(12) United States Patent
Cai

(10) Patent No.: US 9,542,764 B2
(45) Date of Patent: Jan. 10, 2017

(54) DISPLAYING CONTENTS OF A FILE IN DIFFERENT REGIONS

(71) Applicants: Beijing Lenovo Software Ltd., Beijing (CN); Lenovo (Beijing) Limited, Beijing (CN)

(72) Inventor: Mingxiang Cai, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/673,023

(22) Filed: Mar. 30, 2015

(65) Prior Publication Data

US 2016/0155252 A1 Jun. 2, 2016

(30) Foreign Application Priority Data

Dec. 1, 2014 (CN) .......................... 2014 1 0719953

(51) Int. Cl.
*G06T 11/60* (2006.01)
*G06F 3/0481* (2013.01)
*G06F 3/0482* (2013.01)
*G09G 5/14* (2006.01)

(52) U.S. Cl.
CPC ............. *G06T 11/60* (2013.01); *G06F 3/0482* (2013.01); *G06F 3/04817* (2013.01); *G09G 5/14* (2013.01); *G06F 2203/04808* (2013.01); *G06T 2200/24* (2013.01)

(58) Field of Classification Search
None
See application file for complete search history.

(56) References Cited

U.S. PATENT DOCUMENTS

| 6,237,010 B1* | 5/2001 | Hui ......................... G06T 17/00 345/428 |
| 7,945,541 B1* | 5/2011 | Schendel .......... G06F 17/30011 707/695 |
| 2007/0085759 A1* | 4/2007 | Lee ........................ G06F 1/1616 345/1.1 |

OTHER PUBLICATIONS

"German Application Serial No. 102015105022.6, Office Action mailed Sep. 17, 2015", w/ English Translation, 10 pgs.
"Windows 7:Preview Pane—Turn On or Off", (Feb. 6, 2010), 6 pgs.

* cited by examiner

*Primary Examiner* — Edward Martello
(74) *Attorney, Agent, or Firm* — Schwegman Lundberg & Woessner, P.A.

(57) ABSTRACT

The disclosure provides an information processing method and an electronic device. The information processing method includes: acquiring a first file; displaying a first content in a first region in a first display mode, the first content characterizes a first part of a display content of the first file and the first region is a region capable of triggering the display content of the first file to be displayed upon a triggering operation is detected; and displaying a second content in a second region in a second display mode if a first preset condition is satisfied, the second content characterizes a second part of the display content of the first file and the second region is a region capable of triggering the display content of the first file to be displayed upon a triggering operation is detected, the first region is different from the second region.

16 Claims, 6 Drawing Sheets

__(US 9,542,764 B2)__

DISPLAYING CONTENTS OF A FILE IN DIFFERENT REGIONS

PRIORITY APPLICATION

This application claims the benefit under 35 U.S.C. 119 to Chinese Patent Application No. 201410719953.3, filed on 1 Dec. 2014; which application is incorporated herein by reference in its entirety.

TECHNICAL FIELD

The disclosure generally relates to the information processing technology, and particularly, to an information processing method and an electronic device.

BACKGROUND

When a file stored in an electronic device is to be displayed as an icon, it can be displayed in various display styles, including for example a small icon display style, a medium icon display style and a large icon display style, etc., among which switching is allowed. In prior art, the switching among the display styles is solely based on switching among display effects, for example, switching the displaying of icons on an operating system desktop from a small icon display effect to a large icon display effect. Thus, a user can only distinguish between contents of files by their names. In case the files have similar names, the user has to open the files one by one in order to get knowledge of the contents of the files. This inevitably brings inconvenience to user operations. On the other hand, displaying only a picture of the icon and a file name in an icon having a large area also causes a certain degree of waste of display resources.

SUMMARY

An embodiment of the disclosure provides an information processing method, which includes:
  acquiring a first file;
  displaying a first content in a first region in a first display mode, the first content characterizes a first part of a display content of the first file and the first region is a region capable of triggering the display content of the first file to be displayed upon a triggering operation is detected; and
  displaying a second content in a second region in a second display mode, if a first preset condition is satisfied, the second content characterizes a second part of the display content of the first file and the second region is a region capable of triggering the display content of the first file to be displayed upon a triggering operation is detected,
  the first region is different from the second region.

An embodiment of the disclosure also provides an electronic device, which includes:
  a display unit;
  a processor configured to:
    acquire a first file;
    control the display unit to display a first content in a first region in a first display mode, the first content characterizes a first part of a display content of the first file, and the first region is a region capable of triggering the display content of the first file to be displayed upon a triggering operation is detected; and
    control the display unit to display a second content in a second region in a second display mode if a first preset condition is satisfied, the second content characterizes a second part of the display content of the first file, and the second region is a region capable of triggering the display content of the first file to be displayed upon a triggering operation is detected;
  the first region is different from the second region.

DETAILED DESCRIPTION

In the following, the disclosure will be described in further detail in conjunction with the drawings and embodiments.

First Embodiment

Figure 1:
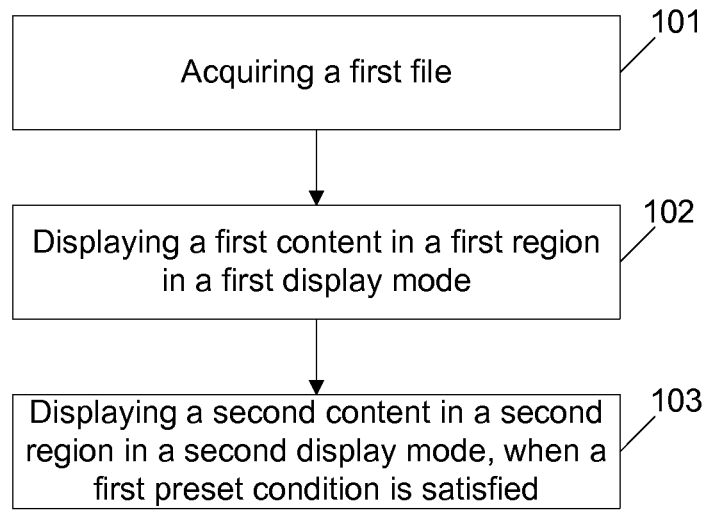
FIG. 1 is a flowchart illustrating an information processing method according to a first embodiment of the disclosure.

An embodiment of the disclosure provides an information processing method applied to an electronic device. FIG. 1 is a flowchart illustrating an information processing method according to the first embodiment of the disclosure. As shown in FIG. 1, the method comprises the following steps.

At step 101, a first file is acquired.

In this embodiment, on one hand, the first file may be image data including multiple frames with display borders, such as a video file, a document file, etc. Specifically, the document file may be for example a PowerPoint (PPT) file, a Word document file, etc. On the other hand, the first file may be image data without frame display border, such as a picture.

Here, the first file is not limited to a certain file in the electronic device, but can be any file in the electronic device.

At step 102, a first content is displayed in a first region in a first display mode, wherein the first content characterizes a first part of a display content of the first file and the first region is a region which allows displaying of the display content of the first file to be triggered when a triggering operation is detected.

At step 103, when a first preset condition is satisfied, a second content is displayed in a second region in a second display mode, wherein the second content characterizes a second part of the display content of the first file and the second region is a region which allows displaying of the display content of the first file to be triggered when a triggering operation is detected. The first region is different from the second region.

In this embodiment, the first content and the second content may be considered as icons of the first file. That is, a user's click on the first content or the second content triggers opening of the first file. The difference is that: the first content is the icon of the first file in the first display mode, while the second content is the icon of the first file in the second display mode. The first display mode differs from the second display mode in that the icons of the first file in respective display modes have different sizes, that is, the first region and the second region are different. When the first region is smaller than the second region, the first display mode may be a small icon display mode and correspondingly the second display mode may be a large icon display mode. When the first region is larger than the second region, the first display mode may be a large icon display mode and correspondingly the second display mode may be a small icon display mode. Of course, in the embodiment, it is not restrictive to have only these two display modes. Instead, there may be more than two display modes, which will not be described here redundantly.

In the embodiment, there is a first relative relationship between the first region and the second region, there is a second relative relationship between the first part and the second part, and the first relative relationship matches with the second relative relationship. Specifically, the first relative relationship may be a size relationship, that is, there is a relationship between sizes of areas of the first region and the second region. For example, the first region is a small region, while the second region is a large region; or the first region is a large region, while the second region is small region. Of course, in practical applications, the areas of the first region and the second region match with the size of the electronic device's screen or display. The small region shall meet the requirements for visibility to the user, and the large region shall meet the requirements for arrangement and aesthetic appearance of all contents displayed in the display area of the screen or display. Preferably, it is desirable for the large region to have an area which facilitates touching with user's finger while preventing misoperation of other file icons. The second relative relationship may be an amount relationship. That is, there is a relationship between amounts of display contents of the first part and the second part. For example, the amount of display content characterized by the first part is large, while the amount of display content characterized by the second part is small; or the amount of display content characterized by the first part is small, while the amount of display content characterized by the second part is large. In view of this, the first relative relationship and the second relative relationship have a positive correlation. For example, when the first region is a small region and the second region is a large region, the amount of display content characterized by the first part is small and the amount of display content characterized by the second part is large. Conversely, when the first region is a large region and the second region is a small region, the amount of display content characterized by the first part is large and the amount of display content characterized by the second part is small.

In the embodiment, the first preset condition being satisfied includes: determining that the first preset condition is satisfied when a first switching operation is detected, wherein the first switching operation is a switching operation to switch from displaying in the first region to displaying in the second region. Alternatively, the first preset condition being satisfied includes: determining that the first preset condition is satisfied when a mode switching instruction is detected, wherein the mode switching instruction characterizes switching from a first input mode to a second input mode.

Specifically, in an exemplary scenario where the first region is a small region and the second region is a large region, with respect to the first case for the first preset condition described above, the first switching operation may be a click operation which is performed on mouse buttons and represents an icon scaling instruction. For example, clicking the left and right buttons of the mouse at the same time triggers switching from displaying the icon in the first region to displaying the icon in the second region or switching from displaying the icon in the second region to displaying the icon in the first region. The first switching operation may also be a touch operation performed by using an operating object (such as a finger, a stylus pen, etc.), and the touch operation may be a gesture operation representing an icon scaling instruction. For example, a gesture of drawing a circle triggers switching from displaying the icon in the first region to displaying the icon in the second region or switching from displaying the icon in the second region to displaying the icon in the first region.

With respect to the second case for the first preset condition described above, the mode switching instruction may be generated by detecting which input device is mainly used to perform input operations on the electronic device. On one hand, in an exemplary scenario where the first region is smaller than the second region and the electronic device is a tablet computer comprising a detachable keyboard, the mode switching instruction may be generated according to whether a peripheral input device is detected. When it is detected that the keyboard is mounted on the tablet computer, it indicates that the user wants to operate the tablet computer using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When the keyboard is detached from the tablet computer, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where no peripheral input device is detected, a mode switching instruction is generated and it is determined, based on the detected mode switching instruction, that the first preset condition is satisfied. Correspondingly, when the first region is larger than the second region and the peripheral input device is detected, a mode switching instruction is generated and it is determined, based on the detected mode switching instruction, that the first preset condition is satisfied.

On the other hand, in an exemplary scenario where the first region is smaller than the second region and the electronic device is an ultrabook computer comprising a rotatable screen, the mode switching instruction may be generated by detecting the state of the electronic device's screen. When it is detected that the screen is in a first state where the vertical orientation of the screen is different from the orientation of the electronic device's keyboard (that is, there is a certain angle between the plane where the screen exists and the plane where the keyboard exists), it indicates that the user wants to operate the electronic device using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When it is detected that the screen is in a second state where the vertical orientation of the screen is the same as the orientation of the keyboard, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where it is detected that the screen of the electronic device switches from the first state to the second state, a mode switching instruction is generated and it is determined, based on the detected mode switching instruction, that the first preset condition is satisfied. Correspondingly, when the first region is larger than the second region and it is detected that the screen of the electronic device switches from the second state to the first state, a mode switching instruction is generated and it is determined, based on the detected mode switching instruction, that the first preset condition is satisfied.

In the embodiment, when the first file is image data including multiple frames with display borders (such as video file including multiple frames or a PPT file including multiple pages), the first part includes X image frames, the second part includes Y image frames, and the ratio between X and Y and the ratio between the first region and the second region have a positive correlation. That is to say, the larger the area occupied by the icon, the more the display content of the first file characterized by the icon, namely, the larger the number of image frames contained in the icon.

When the first file is image data without frame display border (such as a picture), the ratio between sizes of the first part and the second part and the ratio between the first region and the second region have a positive correlation. That is to say, the larger the area occupied by the icon, the larger the size of the display content of the first file characterized by the icon, namely, the larger the relative size of the image contained in the icon to the display content of the first file. In this case, the first content may be part of the display content of the first file, such as a face area in the picture; the second content may be all of the display content of the first file, such as the entire picture. As such, in the first display mode, because the first region is small, the user may get a partial knowledge of the content of the first file based on part of the display content of the first file (such as the face area). In the second display mode, because the second region is large, the user may get a full knowledge of the content of the first file based on all of the display content of the first file (such as the entire picture).

With the technical solution according to the embodiment of the disclosure, an icon switching scheme based on file content is achieved on one hand. On the other hand, the user is enabled to determine a content of a file simply based on the icon of the file and to quickly locate a desired file without having to open files one by one, thereby facilitating user operations and greatly improving user experience.

Second Embodiment

Figure 2:
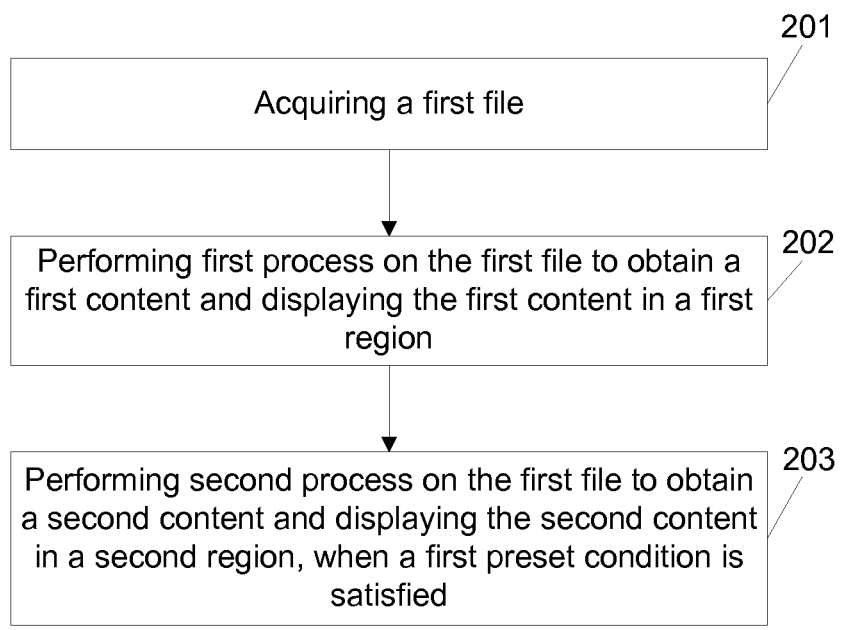
FIG. 2 is a flowchart illustrating an information processing method according to a second embodiment of the disclosure.

An embodiment of the disclosure provides another information processing method applied to an electronic device. FIG. 2 is a flowchart illustrating an information processing method according to the second embodiment of the disclosure. As shown in FIG. 2, the method comprises the following steps.

At step 201, a first file is acquired.

In this embodiment, on one hand, the first file may be image data including multiple frames with display borders, such as a video file, a document file, etc. Specifically, the document file may be for example a Powerpoint (PPT) file, a Word document file, etc. On the other hand, the first file may be image data without frame display border, such as a picture.

Here, the first file is not limited to a certain file in the electronic device, but can be any file in the electronic device.

At step 202, a first process is performed on the first file to obtain a first content, and the first content is displayed in a first region in a first display mode, wherein the first content characterizes a first part of a display content of the first file and the first region is a region which allows displaying of the display content of the first file to be triggered when a triggering operation is detected.

At step 203, when a first preset condition is satisfied, a second process is performed on the first file to obtain a second content, and the second content is displayed in a second region in a second display mode, wherein the second content characterizes a second part of the display content of the first file and the second region is a region which allows displaying of the display content of the first file to be triggered when a triggering operation is detected. The first region is different from the second region.

In this embodiment, the first content and the second content may be considered as icons of the first file. That is, a user's click on the first content or the second content triggers opening of the first file. The difference is that: the first content is the icon of the first file in the first display mode, while the second content is the icon of the first file in the second display mode. The first display mode differs from the second display mode in that the icons of the first file in respective display modes have different sizes, that is, the first region and the second region are different. When the first region is smaller than the second region, the first display mode may be a small icon display mode and correspondingly the second display mode may be a large icon display mode. When the first region is larger than the second region, the first display mode may be a large icon display mode and correspondingly the second display mode may be a small icon display mode. Of course, in the embodiment, it is not restrictive to have only these two display modes. Instead, there may be more than two display modes, which will not be described here redundantly.

In the embodiment, there is a first relative relationship between the first region and the second region, there is a second relative relationship between the first part and the second part, and the first relative relationship matches with the second relative relationship. Specifically, the first relative relationship may be a size relationship, that is, there is a relationship between sizes of areas of the first region and the second region. For example, the first region is a small region, while the second region is a large region; or the first region is a large region, while the second region is small region. Of course, in practical applications, the areas of the first region and the second region match with the size of the electronic device's screen or display. The small region shall meet the requirements for visibility to the user, and the large region shall meet the requirements for arrangement and aesthetic appearance of all contents displayed in the display area of the screen or display. Preferably, it is desirable for the large region to have an area which facilitates touching with user's finger while preventing misoperation of other file icons. The second relative relationship may be an amount relationship. That is, there is a relationship between amounts of display contents of the first part and the second part. For example, the amount of display content characterized by the first part is large, while the amount of display content characterized by the second part is small; or the amount of display content characterized by the first part is small, while the amount of display content characterized by the second part is large. In view of this, the first relative relationship and the second relative relationship have a positive correlation. For example, when the first region is a small region and the second region is a large region, the amount of display content characterized by the first part is small and the amount of display content characterized by the second part is large. Conversely, when the first region is a large region and the second region is a small region, the amount of display content characterized by the first part is large and the amount of display content characterized by the second part is small.

In the embodiment, the first preset condition being satisfied includes: determining that the first preset condition is satisfied when a first switching operation is detected, wherein the first switching operation is a switching operation to switch from displaying in the first region to displaying in the second region. Alternatively, the first preset condition is satisfied when a mode switching instruction is detected, wherein the mode switching instruction characterizes switching from a first input mode to a second input mode.

Specifically, in an exemplary scenario where the first region is a small region and the second region is a large region, with respect to the first case for the first preset condition described above, the first switching operation may be a click operation which is performed on mouse buttons and represents an icon scaling instruction. For example, clicking the left and right buttons of the mouse at the same time triggers switching from displaying the icon in the first region to displaying the icon in the second region or switching from displaying the icon in the second region to displaying the icon in the first region. The first switching operation may also be a touch operation performed by using an operating object (such as a finger, a stylus pen, etc.), and the touch operation may be a gesture operation representing an icon scaling instruction. For example, a gesture of drawing a circle triggers switching from displaying the icon in the first region to displaying the icon in the second region or switching from displaying the icon in the second region to displaying the icon in the first region.

With respect to the second case for the first preset condition described above, the mode switching instruction may be generated by detecting which input device is mainly used to perform input operations on the electronic device. On one hand, in an exemplary scenario where the first region is smaller than the second region and the electronic device is a tablet computer comprising a detachable keyboard, the mode switching instruction may be generated according to whether a peripheral input device is detected. When it is detected that the keyboard is mounted on the tablet computer, it indicates that the user wants to operate the tablet computer using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When the keyboard is detached from the tablet computer, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where no peripheral input device is detected, a mode switching instruction is generated and it is determined, based on the detected mode switching instruction, that the first preset condition is satisfied. Correspondingly, when the first region is larger than the second region and the peripheral input device is detected, a mode switching instruction is generated and it is determined, based on the detected mode switching instruction, that the first preset condition is satisfied.

On the other hand, in an exemplary scenario where the first region is smaller than the second region and the electronic device is an ultrabook computer comprising a rotatable screen, the mode switching instruction may be generated by detecting the state of the electronic device's screen. When it is detected that the screen is in a first state where the vertical orientation of the screen is different from the orientation of the electronic device's keyboard (that is, there is a certain angle between the plane where the screen exists and the plane where the keyboard exists), it indicates that the user wants to operate the electronic device using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When it is detected that the screen is in a second state where the vertical orientation of the screen is the same as the orientation of the keyboard, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where it is detected that the screen of the electronic device switches from the first state to the second state, a mode switching instruction is generated and it is determined, based on the detected mode switching instruction, that the first preset condition is satisfied. Correspondingly, when the first region is larger than the second region and it is detected that the screen of the electronic device switches from the second state to the first state, a mode switching instruction is generated and it is determined, based on the detected mode switching instruction, that the first preset condition is satisfied.

When the first file is image data including multiple frames with display borders (such as video file including multiple frames or a PPT file including multiple pages), the first part includes X image frames, the second part includes Y image frames, and the ratio between X and Y and the ratio between the first region and the second region have a positive correlation. That is to say, the larger the area occupied by the icon, the more the display content of the first file characterized by the icon, namely, the larger the number of image frames contained in the icon.

When the first file is image data without frame display border (such as a picture), the ratio between sizes of the first part and the second part and the ratio between the first region and the second region have a positive correlation. That is to say, the larger the area occupied by the icon, the larger the size of the display content of the first file characterized by the icon, namely, the larger the relative size of the image contained in the icon to the display content of the first file. In this case, the first content may be part of the display content of the first file, such as a face area in the picture; the second content may be all of the display content of the first file, such as the entire picture. As such, in the first display mode, because the first region is small, the user may get a partial knowledge of the content of the first file based on part of the display content of the first file (such as the face area). In the second display mode, because the second region is large, the user may get a full knowledge of the content of the first file based on all of the display content of the first file (such as the entire picture).

In the embodiment, both the first process and the second process are processes based on the display content of the first file. The difference is that: due to a difference between the first region and the second region, there is a difference between the first part and the second part, which in turn leads to a difference between the display content characterized by the first part and the display content characterized by the second part, which further leads to a difference between the first process and the second process. Specifically, the first process and the second process may be processes of analyzing the display content of the first file to obtain a first part and a second part of the display content of the first file, respectively.

In the embodiment, there may be two cases for the first region and the second region: the first region is smaller than the second region; and the second region is smaller than the first region. In the following embodiments, detailed description will be given with respect to the exemplary case where the first region is smaller than the second region. Specific implementations for the case where the second region is smaller than the first region are opposite to specific implementations for the case where the first region is smaller than the second region, and will not be described in detail.

In the following, embodiments of the disclosure will be described in further detail with respect to an exemplary scenario where the first region is smaller than the second region, the first content includes X image frames, the second content includes Y image frames and both X and Y are integer numbers.

With the technical solution according to the embodiment of the disclosure, an icon switching scheme based on file content is achieved on one hand. On the other hand, the user is enabled to determine a content of a file simply based on the icon of the file and to quickly locate a desired file without having to open files one by one, thereby facilitating user operations and greatly improving user experience.

Third Embodiment

Figure 3:
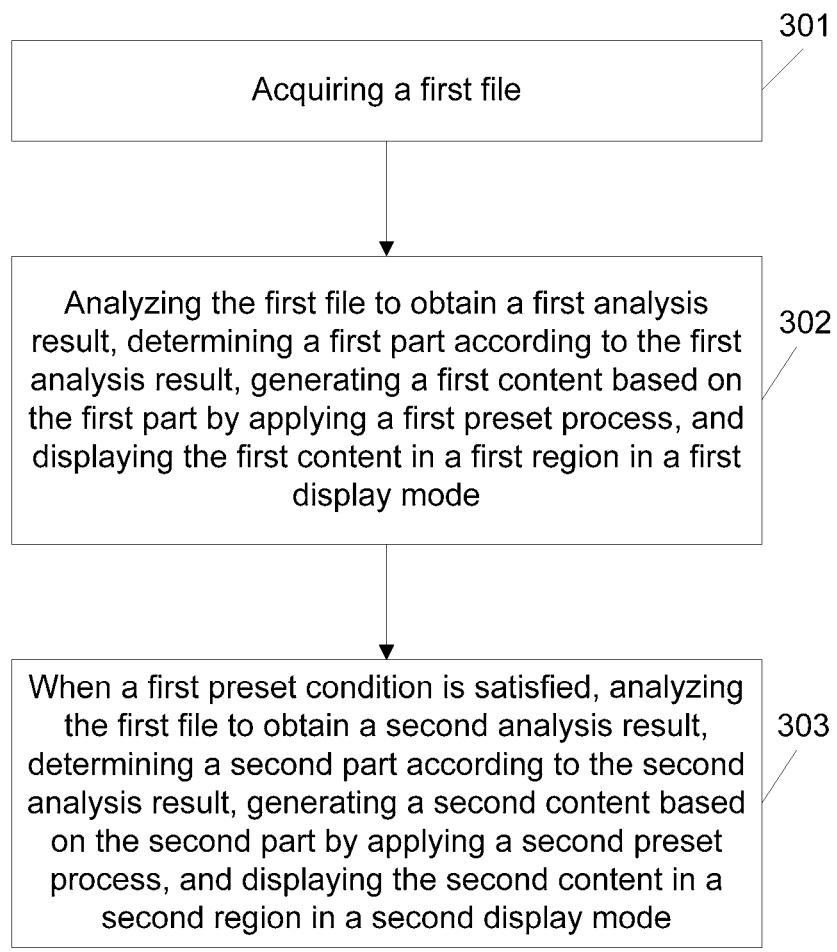
FIG. 3 is a flowchart illustrating an information processing method according to a third embodiment of the disclosure.

An embodiment of the disclosure provides another information processing method applied to an electronic device. FIG. 3 is a flowchart illustrating an information processing method according to the third embodiment of the disclosure. As shown in FIG. 3, the method comprises the following steps.

At step 301, a first file is acquired.

In this embodiment, on one hand, the first file may be image data including multiple frames with display borders, such as a video file, a document file, etc. Specifically, the document file may be for example a Powerpoint (PPT) file, a Word document file, etc. On the other hand, the first file may be image data without frame display border, such as a picture.

Here, the first file is not limited to a certain file in the electronic device, but can be any file in the electronic device.

At step 302, the first file is analyzed to obtain a first analysis result, a first part is determined based on the first analysis result, a first content is generated based on the first part by applying a first preset process, and the first content is displayed in the first region in a first display mode, wherein the first content characterizes the first part of a display content of the first file and the first region is a region which allows displaying of the display content of the first file to be triggered when a triggering operation is detected.

At step 303, when a first preset condition is satisfied, the first file is analyzed to obtain a second analysis result, a second part is determined based on the second analysis result, a second content is generated based on the second part by applying a second preset process, wherein the second content characterizes the second part of the display content of the first file and the second region is a region which allows displaying of the display content of the first file to be triggered when a triggering operation is detected.

In the embodiment, the first content includes X image frames and the second content includes Y image frames, wherein both X and Y are positive integers. Of course, either of X and Y may be 1 or a positive integer greater than or equal to 2. That is, either of the first content and the second content may be one image frame or a combination of at least two image frames.

In this embodiment, the first content and the second content may be considered as icons of the first file. That is, a user's click on the first content or the second content triggers opening of the first file. The difference is that: the first content is the icon of the first file in the first display mode, while the second content is the icon of the first file in the second display mode. The first display mode differs from the second display mode in that the icons of the first file in respective display modes have different sizes, that is, the first region and the second region are different. When the first region is smaller than the second region, the first display mode may be a small icon display mode and correspondingly the second display mode may be a large icon display mode. When the first region is larger than the second region, the first display mode may be a large icon display mode and correspondingly the second display mode may be a small icon display mode. Of course, in the embodiment, it is not restrictive to have only these two display modes. Instead, there may be more than two display modes, which will not be described here redundantly.

In the embodiment, there is a first relative relationship between the first region and the second region, there is a second relative relationship between the first part and the second part, and the first relative relationship matches with the second relative relationship. Specifically, the first relative relationship may be a size relationship, that is, there is a relationship between sizes of areas of the first region and the second region. For example, the first region is a small region, while the second region is a large region; or the first region is a large region, while the second region is small region. Of course, in practical applications, the areas of the first region and the second region match with the size of the electronic device's screen or display. The small region shall meet the requirements for visibility to the user, and the large region shall meet the requirements for arrangement and aesthetic appearance of all contents displayed in the display area of the screen or display. Preferably, it is desirable for the large region to have an area which facilitates touching with user's finger while preventing misoperation of other file icons. The second relative relationship may be an amount relationship. That is, there is a relationship between amounts of display contents of the first part and the second part. For example, the amount of display content characterized by the first part is large, while the amount of display content characterized by the second part is small; or the amount of display content characterized by the first part is small, while the amount of display content characterized by the second part is large. In view of this, the first relative relationship and the second relative relationship have a positive correlation. For example, when the first region is a small region and the second region is a large region, the amount of display content characterized by the first part is small and the amount of display content characterized by the second part is large. Conversely, when the first region is a large region and the second region is a small region, the amount of display content characterized by the first part is large and the amount of display content characterized by the second part is small.

In the embodiment, the first preset condition being satisfied includes: determining that the first preset condition is satisfied when a first switching operation is detected, wherein the first switching operation is a switching operation to switch from displaying in the first region to displaying in the second region. Alternatively, the first preset condition is satisfied when a mode switching instruction is detected, wherein the mode switching instruction characterizes switching from a first input mode to a second input mode.

Specifically, in an exemplary scenario where the first region is a small region and the second region is a large region, with respect to the first case for the first preset condition described above, the first switching operation may be a click operation which is performed on mouse buttons and represents an icon scaling instruction. For example, clicking the left and right buttons of the mouse at the same time triggers switching from displaying the icon in the first region to displaying the icon in the second region or switching from displaying the icon in the second region to displaying the icon in the first region. The first switching operation may also be a touch operation performed by using an operating object (such as a finger, a stylus pen, etc.), and the touch operation may be a gesture operation representing an icon scaling instruction. For example, a touch gesture of drawing a circle triggers switching from displaying the icon in the first region to displaying the icon in the second region or switching from displaying the icon in the second region to displaying the icon in the first region.

With respect to the second case for the first preset condition described above, the mode switching instruction may be generated by detecting which input device is mainly used to perform input operations on the electronic device. On one hand, in an exemplary scenario where the first region is smaller than the second region and the electronic device is a tablet computer comprising a detachable keyboard, the mode switching instruction may be generated according to whether a peripheral input device is detected. When it is detected that the keyboard is mounted on the tablet computer, it indicates that the user wants to operate the tablet computer using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When the keyboard is detached from the tablet computer, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where no peripheral input device is detected, a mode switching instruction is generated and it is determined, based on the detected mode switching instruction, that the first preset condition is satisfied. Correspondingly, when the first region is larger than the second region and the peripheral input device is detected, a mode switching instruction is generated and it is determined, based on the detected mode switching instruction, that the first preset condition is satisfied.

On the other hand, in an exemplary scenario where the first region is smaller than the second region and the electronic device is an ultrabook computer comprising a rotatable screen, the mode switching instruction may be generated by detecting the state of the electronic device's screen. When it is detected that the screen is in a first state where the vertical orientation of the screen is different from the orientation of the electronic device's keyboard (that is, there is a certain angle between the plane where the screen exists and the plane where the keyboard exists), it indicates that the user wants to operate the electronic device using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When it is detected that the screen is in a second state where the vertical orientation of the screen is the same as the orientation of the keyboard, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where it is detected that the screen of the electronic device switches from the first state to the second state, a mode switching instruction is generated and it is determined, based on the detected mode switching instruction, that the first preset condition is satisfied. Correspondingly, when the first region is larger than the second region and it is detected that the screen of the electronic device switches from the second state to the first state, a mode switching instruction is generated and it is determined, based on the detected mode switching instruction, that the first preset condition is satisfied.

In an implementation, the first part includes X image frames and the second part includes Y image frames, wherein both X and Y are positive integers and X is less than Y. Accordingly, determining the first part based on the first analysis result at step 302 comprises determining, based on the first analysis result, X image frames in the first file which satisfy the first preset condition. Correspondingly, determining the second part based on the second analysis result at step 303 comprises determining, based on the second analysis result, Y image frames in the first file which satisfy the second preset condition Specifically, in the case where the first region is smaller than the second region, the number of image frames included in the first part corresponding to the first display mode (small icon display mode) is less than the number of image frames included in the second part corresponding to the second display mode (large icon display mode), that is, the display content of the first file characterized by the icon in the second display mode contains a larger number of image frames and is more informative. The X image frames and the Y image frames may be X image frames and Y image frames from the multi-frame image data of the first file. Alternatively, the X image frames and the Y image frames may be X image frames and Y image frames respectively characterized by X parts and Y parts of the one-frame image data of the first file. Correspondingly, the first image is image data including multiple frames with display borders or image data without frame display border.

When the first file is image data including multiple frames with display borders (such as video file including multiple frames or a PPT file including multiple pages), the first part includes X image frames, the second part includes Y image frames, and the ratio between X and Y and the ratio between the first region and the second region have a positive correlation. That is to say, the larger the area occupied by the icon, the more the display content of the first file characterized by the icon, namely, the larger the number of image frames contained in the icon.

When the first file is image data without frame display border (such as a picture), the ratio between sizes of the first part and the second part and the ratio between the first region and the second region have a positive correlation. That is to say, the larger the area occupied by the icon, the larger the size of the display content of the first file characterized by the icon, namely, the larger the relative size of the image contained in the icon to the display content of the first file.

With the technical solution according to the embodiment of the disclosure, an icon switching scheme based on file content is achieved on one hand. On the other hand, the user is enabled to determine a content of a file simply based on the icon of the file and to quickly locate a desired file without having to open files one by one, thereby facilitating user operations and greatly improving user experience.

In the following, the fourth embodiment of the disclosure will be described in further detail with respect to an exemplary scenario where the first file is image data including multiple frames with display borders. The fifth embodiment of the disclosure will be described in further detail with respect to an exemplary scenario where the first file is image data without frame display border.

Fourth Embodiment

Figure 4:
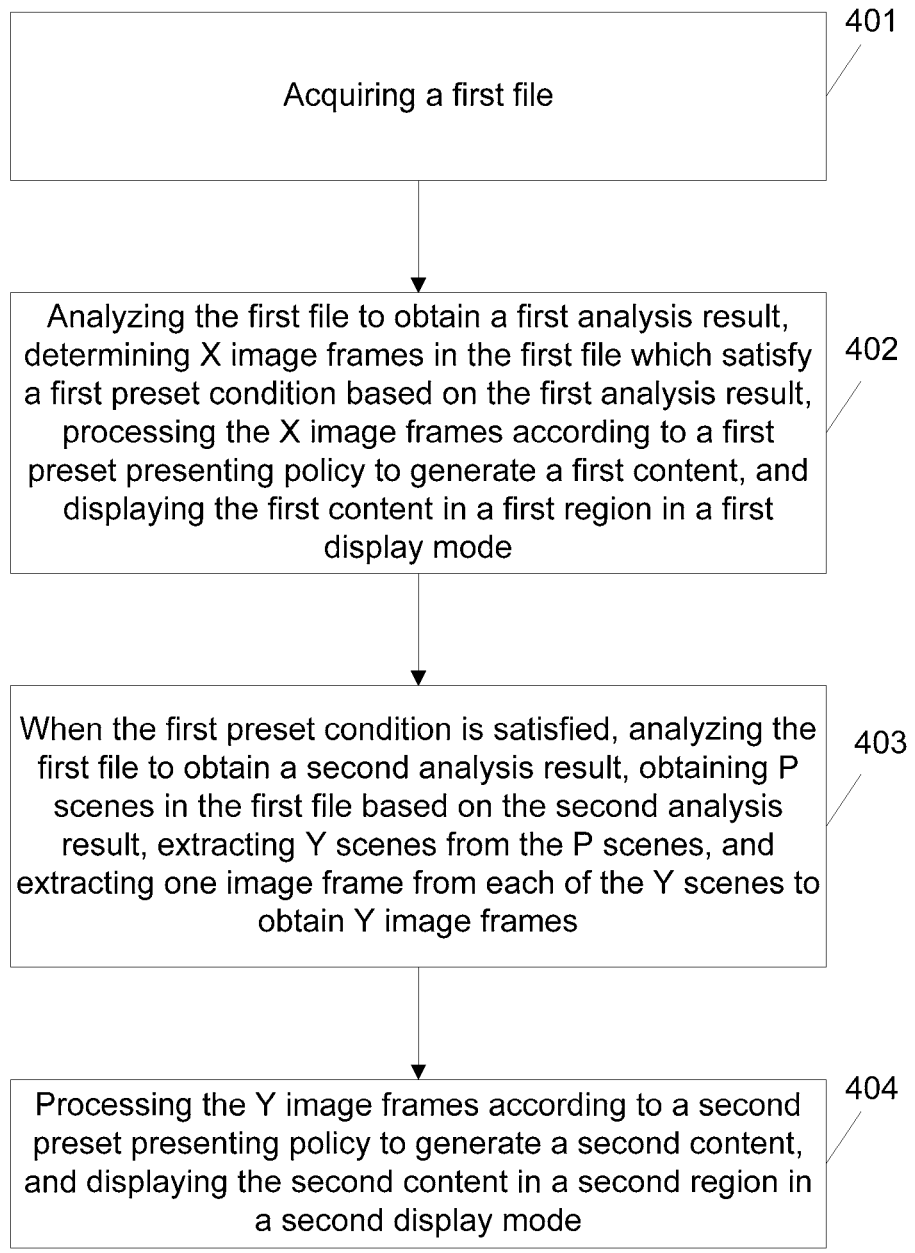
FIG. 4 is a flowchart illustrating an information processing method according to a fourth embodiment of the disclosure.

An embodiment of the disclosure provides another information processing method applied to an electronic device. FIG. 4 is a flowchart illustrating an information processing method according to the fourth embodiment of the disclosure. As shown in FIG. 4, the method comprises the following steps.

At step 401, a first file is acquired.

In this embodiment, the first file is image data including multiple frames with display borders, such as a video file, a document file, etc. Specifically, the document file may be for example a Powerpoint (PPT) file, a Word document file, etc.

Here, the first file is not limited to a certain file in the electronic device, but can be any file in the electronic device.

At step 402, the first file is analyzed to obtain a first analysis result, X image frames in the first file which satisfy a first preset condition are determined based on the first analysis result, the X image frames are processed according to a first preset presenting strategy to generate a first content, and the first content is displayed in a first region in a first display mode, wherein the first region is a region which allows displaying of a display content of the first file to be triggered when a triggering operation is detected.

In the embodiment, the X image frames in the first file which satisfy the first preset condition may be determined specifically by using the determining procedure of step 403, where P scenes in the first file are obtained, X scenes are extracted from the P scenes, one image frame is extracted from each of the X scenes to obtain X image frames. The X image frames in the first file which satisfy the first preset condition may be also determined by using the first X image frames in the first file as the X image frames, wherein x may be any positive integer less than the number of frames included in the first file.

When X is 1, the first content is generated directly from the X=1 image frame and the first content is displayed in the first region. When X is greater than 1, the first preset presenting strategy may be the same as a second preset presenting strategy to be described in step 404.

At step 403, when the first preset condition is satisfied, the first file is analyzed to obtain a second analysis result, P scenes in the first file are obtained based on the second analysis result, Y scenes are extracted from the P scenes, and one image frame is extracted from each of the Y scenes to obtain Y image frames, wherein both Y and P are positive integers and Y is less than or equal to P.

In the embodiment, the first content and the second content may be considered as icons of the first file. That is, a user's click on the first content or the second content triggers opening of the first file. The difference is that: the first content is the icon of the first file in the first display mode, while the second content is the icon of the first file in the second display mode. The first display mode differs from the second display mode in that the icons of the first file in respective display modes have different sizes, that is, the first region and the second region are different. When the first region is smaller than the second region, the first display mode may be a small icon display mode and correspondingly the second display mode may be a large icon display mode. When the first region is larger than the second region, the first display mode may be a large icon display mode and correspondingly the second display mode may be a small icon display mode. Of course, in the embodiment, it is not restrictive to have only these two display modes. Instead, there may be more than two display modes, which will not be described here redundantly.

In the embodiment, there is a first relative relationship between the first region and the second region, there is a second relative relationship between the first part and the second part, and the first relative relationship matches with the second relative relationship. Specifically, the first relative relationship may be a size relationship, that is, there is a relationship between sizes of areas of the first region and the second region. For example, the first region is a small region, while the second region is a large region; or the first region is a large region, while the second region is small region. Of course, in practical applications, the areas of the first region and the second region match with the size of the electronic device's screen or display. The small region shall meet the requirements for visibility to the user, and the large region shall meet the requirements for arrangement and aesthetic appearance of all contents displayed in the display area of the screen or display. Preferably, it is desirable for the large region to have an area which facilitates touching with user's finger while preventing misoperation of other file icons. The second relative relationship may be an amount relationship. That is, there is a relationship between amounts of display contents of the first part and the second part. For example, the amount of display content characterized by the first part is large, while the amount of display content characterized by the second part is small; or the amount of display content characterized by the first part is small, while the amount of display content characterized by the second part is large. In view of this, the first relative relationship and the second relative relationship have a positive correlation. For example, when the first region is a small region and the second region is a large region, the amount of display content characterized by the first part is small and the amount of display content characterized by the second part is large. Conversely, when the first region is a large region and the second region is a small region, the amount of display content characterized by the first part is large and the amount of display content characterized by the second part is small.

In the embodiment, the first preset condition being satisfied includes: determining that the first preset condition is satisfied when a first switching operation is detected, wherein the first switching operation is a switching operation to switch from displaying in the first region to displaying in the second region. Alternatively, the first preset condition is satisfied when a mode switching instruction is detected, wherein the mode switching instruction characterizes switching from a first input mode to a second input mode.

Specifically, in an exemplary scenario where the first region is a small region and the second region is a large region, with respect to the first case for the first preset condition described above, the first switching operation may be a click operation which is performed on mouse buttons and represents an icon scaling instruction. For example, clicking the left and right buttons of the mouse at the same time triggers switching from displaying the icon in the first region to displaying the icon in the second region or switching from displaying the icon in the second region to displaying the icon in the first region. The first switching operation may also be a touch operation performed by using an operating object (such as a finger, a stylus pen, etc.), and the touch operation may be a gesture operation representing an icon scaling instruction. For example, a gesture of drawing a circle triggers switching from displaying the icon in the first region to displaying the icon in the second region or switching from displaying the icon in the second region to displaying the icon in the first region.

With respect to the second case for the first preset condition described above, the mode switching instruction may be generated by detecting which input device is mainly used to perform input operations on the electronic device. On one hand, in an exemplary scenario where the first region is smaller than the second region and the electronic device is a tablet computer comprising a detachable keyboard, the mode switching instruction may be generated according to whether a peripheral input device is detected. When it is detected that the keyboard is mounted on the tablet computer, it indicates that the user wants to operate the tablet computer using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When the keyboard is detached from the tablet computer, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where no peripheral input device is detected, a mode switching instruction is generated and it is determined, based on the detected mode switching instruction, that the first preset condition is satisfied. Correspondingly, when the first region is larger than the second region and the peripheral input device is detected, a mode switching instruction is generated and it is determined, based on the detected mode switching instruction, that the first preset condition is satisfied.

On the other hand, in an exemplary scenario where the first region is smaller than the second region and the electronic device is an ultrabook computer comprising a rotatable screen, the mode switching instruction may be generated by detecting the state of the electronic device's screen. When it is detected that the screen is in a first state where the vertical orientation of the screen is different from the orientation of the electronic device's keyboard (that is, there is a certain angle between the plane where the screen exists and the plane where the keyboard exists), it indicates that the user wants to operate the electronic device using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When it is detected that the screen is in a second state where the vertical orientation of the screen is the same as the orientation of the keyboard, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where it is detected that the screen of the electronic device switches from the first state to the second state, a mode switching instruction is generated and it is determined, based on the detected mode switching instruction, that the first preset condition is satisfied. Correspondingly, when the first region is larger than the second region and it is detected that the screen of the electronic device switches from the second state to the first state, a mode switching instruction is generated and it is determined, based on the detected mode switching instruction, that the first preset condition is satisfied.

In the embodiment, the first file may be a video file including multiple image frames and typically including at least one scene. Specifically, the first file may be analyzed frame by frame to identify face parameters or background parameters. Video frames having the same face parameters or background parameters may be determined as belonging to the same scene. Based on this rule, P scenes are obtained from the first file. Further, when P is a large number (for example larger than 6), the P scenes may be sorted in descending order of durations of the scenes or in descending order of occurrence numbers of the scenes, and Y scenes are extracted from the P scenes to remove unimportant scenes and obtain frames of key scenes. Still further, one image frame is extracted from each of the Y scenes to obtain the Y image frames. Each of the Y image frames may be the first image in each of the Y scenes or an image in each of the Y scenes which includes the maximum number of figures or is the most colorful or satisfies some other preset parameter restriction. Specifically, in the embodiment, the process of analyzing the image data is a prior art process, for which any image analysis approach in the prior art may be used and no detailed description is given here redundantly.

In the embodiment, the first file may also be a document file including multiple pages, such as a PPT file or a Word file, etc. This document file typically includes multiple titles, such as first level title, second level title, third level title, text, etc. Specifically, the first file may be analyzed to identify all levels of titles in the document file which are used as scenes mentioned in step 403. Based on this rule, P scenes are obtained from the first file. Further, when P is a large number (for example larger than 6), the P scenes may be sorted in descending order of character numbers in the scenes or in descending order of capacities of the scenes, and Y scenes are extracted from the P scenes to remove unimportant scenes and obtain key scenes. Still further, one image frame is extracted from each of the Y scenes to obtain the Y image frames. Each of the Y image frames may be the display content of the first page in each of the Y scenes or title contents in each of the Y scenes or contents that satisfies some other preset parameter restriction. Specifically, in the embodiment, the process of analyzing the document data is a prior art process, for which any document analysis approach in the prior art may be used and no detailed description is given here redundantly.

At step 404, the Y image frames are processed according to a second preset presenting strategy to generate a second content, and the second content is displayed in a second region in a second display mode, wherein the second region is a region which allows displaying of the display content of the first file to be triggered when a triggering operation is detected.

Here, the preset presenting strategy is a preset image stitching strategy. Accordingly, processing the Y image frames according to the preset presenting strategy to generate the second content comprises:

obtaining an attribute parameter for each of the Y image frames; determining, based on the attribute parameter, a first parameter for each of the Y image frames; and stitching together the Y image frames based on their first parameters to generate the second content such that a size and/or a position of each image frame in the second content is associated with the first parameter for that image frame, wherein the first parameter for an image frame characterizes an importance of that image frame in the first file.

Alternatively, the preset presenting strategy is a preset animating strategy. Accordingly, processing the Y image frames according to the preset presenting strategy to generate the second content comprises:

obtaining an attribute parameter for each of the Y image frames; determining, based on the attribute parameter, a first parameter for each of the Y image frames; setting a first time interval based on the first parameter; and animating the Y image frames based on their first time intervals to generate the second content, wherein the first parameter for an image frame characterizes an importance of that image frame in the first file, and the first time interval is a time interval between every two image frames or a time duration for which each image frame stays displayed.

On one hand, in the embodiment, when the second preset presenting strategy is the preset image stitching strategy, the first parameter may be determined according to the approach set forth in step 403 for determining the Y scenes. Specifically, when the first file is a video file including multiple image frames, durations or occurrence numbers of Y scenes corresponding to the Y image frames are obtained, and the Y scenes are sorted in descending order of the durations of the scenes or in descending order of the occurrence numbers of the scenes. Thus, the first parameter for a scene may be the duration of the scene or the occurrence number of the scene. The longer the duration of a scene is or the more the occurrence number of a scene is, the more important the scene is and correspondingly the more important the scene is in the first file. Alternatively, when the first file is a document file including multiple pages, Y scenes (which are text contents under Y titles) corresponding to the Y image frames are obtained, and the Y scenes are sorted in descending order of the character numbers in the scenes or in descending order of capacities of the scenes. Thus, the first parameter for a scene may be the character number of the scene or the capacity of the scene. The more the character number of a scene is or the larger the capacity of the scene, the more important the scene is.

Figure 5A:
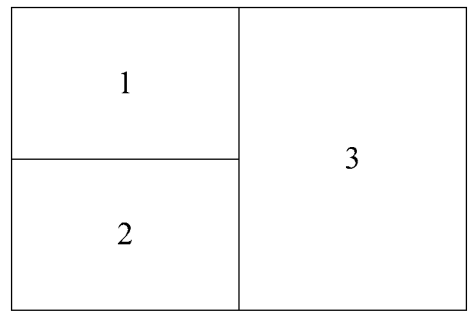
FIGS. 5a-5c are diagrams illustrating examples of a second content in an embodiment of the disclosure.
Figure 5B:
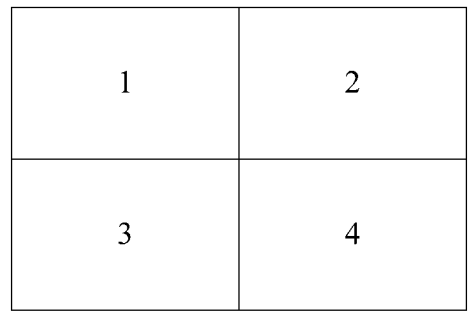
Figure 5C:
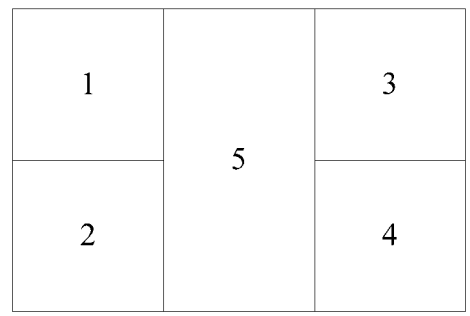

In step 404, the Y image frames are stitched together according to the importance of the first parameters. FIGS. 5a-5c are diagrams illustrating examples of the second content in the embodiment of the disclosure. As illustrated in FIGS. 5a-5c, in the Y image frames (three to five image frames in FIGS. 5a-5c, respectively), when the difference between first parameters for every two of the Y image frames is not greater than a threshold, the Y image frames may be considered as having the same importance. Accordingly, the Y image frames may be distributed uniformly (in terms of size and position) in the second content, as shown in FIG. 5b. When the first parameter for one of the Y image frames is greater than the first parameters for the other image frames by the first threshold, said one image frame may be considered as having a higher importance. Accordingly, the size of said one image frame in the arrangement of the second content may be increased so that said one image frame is obviously larger than the other image frames, as shown in FIG. 5a. When the first parameter for one of the Y image frames is greater than the first parameters for the other image frames by the first threshold, said one image frame may be considered as having a higher importance. Accordingly, not only the size of said one image frame in the arrangement of the second content may be increased but also said one image frame is displayed at the center of the second content so that said one image frame is easier to be viewed, as shown in FIG. 5c.

On the other hand, in the embodiment, when the second preset presenting strategy is the preset animating strategy, the approach for determining the first parameter is the same as the approach described above for determining the first parameter in the case of the preset image stitching strategy and will not be described redundantly. Specifically, the first time interval is set based on the importance of the first parameter. For example, when the first parameter of a scene is the duration of the scene or the occurrence number of the scene, the first parameters are sorted in descending order of the durations of the scenes or in descending order of the occurrence numbers of the scenes. The longer the duration of a scene is or the more the occurrence number of a scene is, the more important the scene is. When the first time interval is a time interval between every two image frames, the longer the duration of a scene is or the more the occurrence number of a scene is, the shorter the first time interval may be set for the scene; while the shorter the duration of a scene is or the less the occurrence number of a scene is, the longer the first time interval may be set for the scene. As such, important images in the second content may be viewed promptly. When the first time interval a time duration for which each image frame stays displayed, the longer the duration of a scene is or the more the occurrence number of a scene is, the longer the first time interval may be set for the scene; while the shorter the duration of a scene is or the less the occurrence number of a scene is, the shorter the first time interval may be set for the scene. As such, important images in the second content may stay displayed for long periods of time and are thus easier to be viewed by the user.

With the technical solution according to the embodiment of the disclosure, an icon switching scheme based on file content is achieved on one hand. On the other hand, the user is enabled to determine a content of a file simply based on the icon of the file and to quickly locate a desired file without having to open files one by one, thereby facilitating user operations and greatly improving user experience.

Fifth Embodiment

Figure 6:
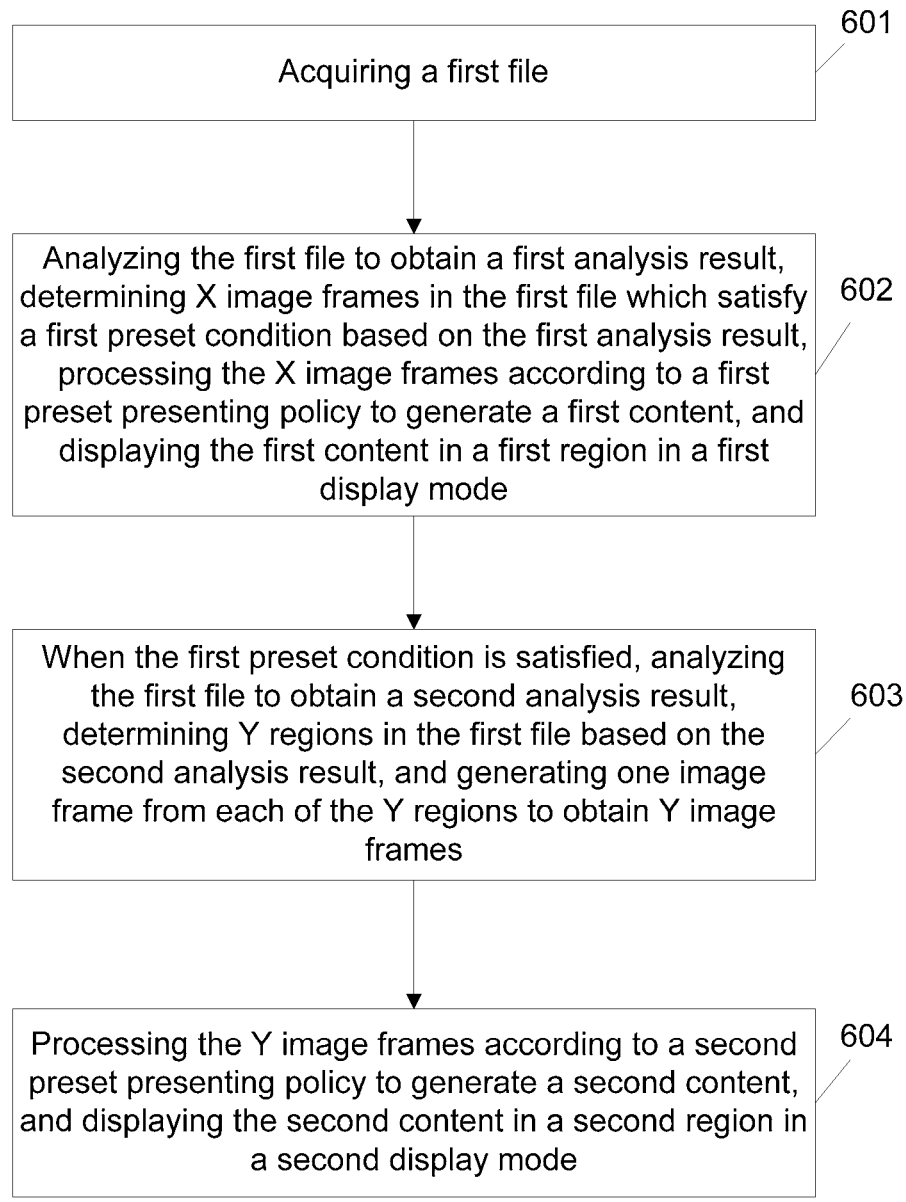
FIG. 6 is a flowchart illustrating an information processing method according to a fifth embodiment of the disclosure.

An embodiment of the disclosure provides another information processing method applied to an electronic device. FIG. 6 is a flowchart illustrating an information processing method according to the fifth embodiment of the disclosure. As shown in FIG. 6, the method comprises the following steps.

At step 601, a first file is acquired.

In this embodiment, the first file is image data without frame display border, such as a picture.

Here, the first file is not limited to a certain file in the electronic device, but can be any file in the electronic device.

At step 602, the first file is analyzed to obtain a first analysis result, X image frames in the first file which satisfy a first preset condition are determined based on the first analysis result, the X image frames are processed according to a first preset presenting strategy to generate a first content, and the first content is displayed in a first region in a first display mode, wherein the first region is a region which allows displaying of a display content of the first file to be triggered when a triggering operation is detected.

In the embodiment, the X image frames in the first file which satisfy the first preset condition may be determined specifically by using the determining procedure of step 603, where X regions in the first file are determined according to a preset extracting strategy, and display contents of the X regions are extracted to generate the X image frames.

When X is 1, the first content is generated directly from the X=1 image frame and the first content is displayed in the first region. When X is greater than 1, the first preset presenting strategy may be the same as a second preset presenting strategy to be described in step 604.

At step 603, when the first preset condition is satisfied, the first file is analyzed to obtain a second analysis result, Y regions in the first file are determined based on the second analysis result, and one image frame is generated for each of the Y regions to obtain Y image frames.

In the embodiment, the first content and the second content may be considered as icons of the first file. That is, a user's click on the first content or the second content triggers opening of the first file. The difference is that: the first content is the icon of the first file in the first display mode, while the second content is the icon of the first file in the second display mode. The first display mode differs from the second display mode in that the icons of the first file in respective display modes have different sizes, that is, the first region and the second region are different. When the first region is smaller than the second region, the first display mode may be a small icon display mode and correspondingly the second display mode may be a large icon display mode. When the first region is larger than the second region, the first display mode may be a large icon display mode and correspondingly the second display mode may be a small icon display mode. Of course, in the embodiment, it is not restrictive to have only these two display modes. Instead, there may be more than two display modes, which will not be described here redundantly.

In the embodiment, there is a first relative relationship between the first region and the second region, there is a second relative relationship between the first part and the second part, and the first relative relationship matches with the second relative relationship. Specifically, the first relative relationship may be a size relationship, that is, there is a relationship between sizes of areas of the first region and the second region. For example, the first region is a small region, while the second region is a large region; or the first region is a large region, while the second region is small region. Of course, in practical applications, the areas of the first region and the second region match with the size of the electronic device's screen or display. The small region shall meet the requirements for visibility to the user, and the large region shall meet the requirements for arrangement and aesthetic appearance of all contents displayed in the display area of the screen or display. Preferably, it is desirable for the large region to have an area which facilitates touching with user's finger while preventing misoperation of other file icons. The second relative relationship may be an amount relationship. That is, there is a relationship between amounts of display contents of the first part and the second part. For example, the amount of display content characterized by the first part is large, while the amount of display content characterized by the second part is small; or the amount of display content characterized by the first part is small, while the amount of display content characterized by the second part is large. In view of this, the first relative relationship and the second relative relationship have a positive correlation. For example, when the first region is a small region and the second region is a large region, the amount of display content characterized by the first part is small and the amount of display content characterized by the second part is large. Conversely, when the first region is a large region and the second region is a small region, the amount of display content characterized by the first part is large and the amount of display content characterized by the second part is small.

In the embodiment, the first preset condition being satisfied includes: determining that the first preset condition is satisfied when a first switching operation is detected, wherein the first switching operation is a switching operation to switch from displaying in the first region to displaying in the second region. Alternatively, the first preset condition is satisfied when a mode switching instruction is detected, wherein the mode switching instruction characterizes switching from a first input mode to a second input mode.

Specifically, in an exemplary scenario where the first region is a small region and the second region is a large region, with respect to the first case for the first preset condition described above, the first switching operation may be a click operation which is performed on mouse buttons and represents an icon scaling instruction. For example, clicking the left and right buttons of the mouse at the same time triggers switching from displaying the icon in the first region to displaying the icon in the second region or switching from displaying the icon in the second region to displaying the icon in the first region. The first switching operation may also be a touch operation performed by using an operating object (such as a finger, a stylus pen, etc.), and the touch operation may be a gesture operation representing an icon scaling instruction. For example, a gesture of drawing a circle triggers switching from displaying the icon in the first region to displaying the icon in the second region or switching from displaying the icon in the second region to displaying the icon in the first region.

With respect to the second case for the first preset condition described above, the mode switching instruction may be generated by detecting which input device is mainly used to perform input operations on the electronic device. On one hand, in an exemplary scenario where the first region is smaller than the second region and the electronic device is a tablet computer comprising a detachable keyboard, the mode switching instruction may be generated according to whether a peripheral input device is detected. When it is detected that the keyboard is mounted on the tablet computer, it indicates that the user wants to operate the tablet computer using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When the keyboard is detached from the tablet computer, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where no peripheral input device is detected, a mode switching instruction is generated and it is determined, based on the detected mode switching instruction, that the first preset condition is satisfied. Correspondingly, when the first region is larger than the second region and the peripheral input device is detected, a mode switching instruction is generated and it is determined, based on the detected mode switching instruction, that the first preset condition is satisfied.

On the other hand, in an exemplary scenario where the first region is smaller than the second region and the electronic device is an ultrabook computer comprising a rotatable screen, the mode switching instruction may be generated by detecting the state of the electronic device's screen. When it is detected that the screen is in a first state where the vertical orientation of the screen is different from the orientation of the electronic device's keyboard (that is, there is a certain angle between the plane where the screen exists and the plane where the keyboard exists), it indicates that the user wants to operate the electronic device using the keyboard. Thus, the first input mode may be a keyboard operation mode, in which the user may control movement of a cursor on the screen by using a touch panel on the keyboard. Because the cursor is small, in the first input mode, an icon of a file in the electronic device may be characterized by the first content displayed in the first region in the first display mode. When it is detected that the screen is in a second state where the vertical orientation of the screen is the same as the orientation of the keyboard, it indicates that the user wants to operate the tablet computer using the touch screen. Thus, the second input mode may be a touch operation mode, in which the user may open a file or initiate a program by performing a touch operation using the operating object (such as a finger). Because the area pressed by the finger is large, in the second input mode, the icon of the file in the electronic device may be characterized by the second content displayed in the second region in the second display mode, in order to facilitate accurate touching of the desired file with the user's finger while preventing misoperation of other files. Consequently, in that case where it is detected that the screen of the electronic device switches from the first state to the second state, a mode switching instruction is generated and it is determined, based on the detected mode switching instruction, that the first preset condition is satisfied. Correspondingly, when the first region is larger than the second region and it is detected that the screen of the electronic device switches from the second state to the first state, a mode switching instruction is generated and it is determined, based on the detected mode switching instruction, that the first preset condition is satisfied.

In the embodiment, the first file is image data without frame display border, such as a picture. The Y regions are Y regions in the picture, and may be Y key regions in the picture, such as region where a face exists, region abounding in colors, etc. The extracting strategy may be configured in advance in the electronic device, and the Y regions are extracted according to the extracting strategy. Specifically, in the embodiment of the disclosure, the process of analyzing the image data is a prior art process, for which any image analysis approach in the prior art may be used and no detailed description is given here redundantly. Here, when the number of regions determined by applying the above extracting strategy is large, Y regions may be extracted from the determined regions. Also, priorities may be configured for the extracting strategy. For example, the priority of a region where a face exists is higher than the priority of a region abounding in colors, and thus the Y regions include regions where faces exist, and an appropriate number of regions abounding in colors are extracted randomly.

At step 604, the Y image frames are processed according to a second preset presenting strategy to generate a second content, and the second content is displayed in a second region in a second display mode, wherein the second region is a region which allows displaying of the display content of the first file to be triggered when a triggering operation is detected.

Here, the preset presenting strategy is a preset image stitching strategy. Accordingly, processing the Y image frames according to the preset presenting strategy to generate the second content comprises:

obtaining an attribute parameter for each of the Y image frames; determining, based on the attribute parameter, a first parameter for each of the Y image frames; and stitching together the Y image frames based on their first parameters to generate the second content such that a size and/or a position of each image frame in the second content is associated with the first parameter for that image frame, wherein the first parameter for an image frame characterizes an importance of that image frame in the first file.

Alternatively, the preset presenting strategy is a preset animating strategy. Accordingly, processing the Y image frames according to the preset presenting strategy to generate the second content comprises:

obtaining an attribute parameter for each of the Y image frames; determining, based on the attribute parameter, a first parameter for each of the Y image frames; setting a first time interval based on the first parameter; and animating the Y image frames based on their first time intervals to generate the second content, wherein the first parameter for an image frame characterizes an importance of that image frame in the first file, and the first time interval is a time interval between every two image frames or a time duration for which each image frame stays displayed.

On one hand, in the embodiment, when the second preset presenting strategy is the preset image stitching strategy, the first parameter may be determined according to the approach set forth in step 603 for determining the Y scenes. Specifically, when the first file is a video file including multiple image frames, durations or occurrence numbers of Y scenes corresponding to the Y image frames are obtained, and the Y scenes are sorted in descending order of the durations of the scenes or in descending order of the occurrence numbers of the scenes. Thus, the first parameter for a scene may be the duration of the scene or the occurrence number of the scene. The longer the duration of a scene is or the more the occurrence number of a scene is, the more important the scene is and correspondingly the more important the scene is in the first file. Alternatively, when the first file is a document file including multiple pages, Y scenes (which are text contents under Y titles) corresponding to the Y image frames are obtained, and the Y scenes are sorted in descending order of the character numbers in the scenes or in descending order of capacities of the scenes. Thus, the first parameter for a scene may be the character number of the scene or the capacity of the scene. The more the character number of a scene is or the larger the capacity of the scene, the more important the scene is.

In step 604, the Y image frames are stitched together according to the importance of the first parameters. As illustrated in FIGS. 5a-5c, in the Y image frames (three to five image frames in FIGS. 5a-5c, respectively), when the difference between first parameters for every two of the Y image frames is not greater than a threshold, the Y image frames may be considered as having the same importance. Accordingly, the Y image frames may be distributed uniformly (in terms of size and position) in the second content, as shown in FIG. 5b. When the first parameter for one of the Y image frames is greater than the first parameters for the other image frames by the first threshold, said one image frame may be considered as having a higher importance. Accordingly, the size of said one image frame in the arrangement of the second content may be increased so that said one image frame is obviously larger than the other image frames, as shown in FIG. 5a. When the first parameter for one of the Y image frames is greater than the first parameters for the other image frames by the first threshold, said one image frame may be considered as having a higher importance. Accordingly, not only the size of said one image frame in the arrangement of the second content may be increased but also said one image frame is displayed at the center of the second content so that said one image frame is easier to be viewed, as shown in FIG. 5c.

On the other hand, in the embodiment, when the second preset presenting strategy is the preset animating strategy, the approach for determining the first parameter is the same as the approach described above for determining the first parameter in the case of the preset image stitching strategy and will not be described redundantly. Specifically, the first time interval is set based on the importance of the first parameter. For example, when the first parameter of a scene is the duration of the scene or the occurrence number of the scene, the first parameters are sorted in descending order of the durations of the scenes or in descending order of the occurrence numbers of the scenes. The longer the duration of a scene is or the more the occurrence number of a scene is, the more important the scene is. When the first time interval is a time interval between every two image frames, the longer the duration of a scene is or the more the occurrence number of a scene is, the shorter the first time interval may be set for the scene; while the shorter the duration of a scene is or the less the occurrence number of a scene is, the longer the first time interval may be set for the scene. As such, important images in the second content may be viewed promptly. When the first time interval a time duration for which each image frame stays displayed, the longer the duration of a scene is or the more the occurrence number of a scene is, the longer the first time interval may be set for the scene; while the shorter the duration of a scene is or the less the occurrence number of a scene is, the shorter the first time interval may be set for the scene. As such, important images in the second content may stay displayed for long periods of time and are thus easier to be viewed by the user.

With the technical solution according to the embodiment of the disclosure, an icon switching scheme based on file content is achieved on one hand. On the other hand, the user is enabled to determine a content of a file simply based on the icon of the file and to quickly locate a desired file without having to open files one by one, thereby facilitating user operations and greatly improving user experience.

Sixth Embodiment

Figure 7:
FIG. 7 is a diagram illustrating a first structural composition of an electronic device according to an embodiment of the disclosure.

An embodiment of the disclosure also provides an electronic device. FIG. 7 is a diagram illustrating a first structural composition of the electronic device according to an embodiment of the disclosure. As shown in FIG. 7, the electronic device comprises an acquiring unit 701, a displaying unit 702 and a determining unit 703, wherein the acquiring unit 701 is configured to acquire a first file, the displaying unit 702 is configured to display a first content in a first region in a first display mode, wherein the first content characterizes a first part of a display content of the first file and the first region is a region which allows displaying of the display content of the first file to be triggered when a triggering operation is detected, and the displaying unit 702 is further configured to display a second content in a second region in a second display mode, wherein the second content characterizes a second part of the display content of the first file and the second region is a region which allows displaying of the display content of the first file to be triggered when a triggering operation is detected, wherein the first region is different from the second region, the determining unit 703 is configured to determine that a first preset condition is satisfied so as to trigger the displaying unit 702 to switch to the second display mode.

In the embodiment, there is a first relative relationship between the first region and the second region, there is a second relative relationship between the first part and the second part, and the first relative relationship matches with the second relative relationship.

In the embodiment, the first file is image data including multiple frames with display borders. Accordingly, the first content includes X image frames, the second content includes Y image frames, and the ratio between X and Y and the ratio between the first region and the second region have a positive correlation, both X and Y being positive integers.

Alternatively, the first file is image data without frame display border. Accordingly, the ratio between sizes of the first part and the second part and the ratio between the first region and the second region have a positive correlation.

Specifically, the determining unit 703 is configured to determine that the first preset condition is satisfied when a first switching operation is detected, wherein the first switching operation is a switching operation to switch from displaying in the first region to displaying in the second region. Alternatively, the determining unit 703 is configured to determine that the first preset condition is satisfied when a mode switching instruction is detected, wherein the mode switching instruction characterizes switching from a first input mode to a second input mode.

Those skilled in the art should appreciate that the functions of respective processing units in the electronic device according to the embodiment may be understood by referring to related description of the above-described information process method. The processing units in the electronic device according to the embodiment may be implemented by analogous circuits which realize the functions described in the embodiment or by running, on an intelligent terminal, software which realizes the functions described in the embodiment.

Seventh Embodiment

Figure 8:
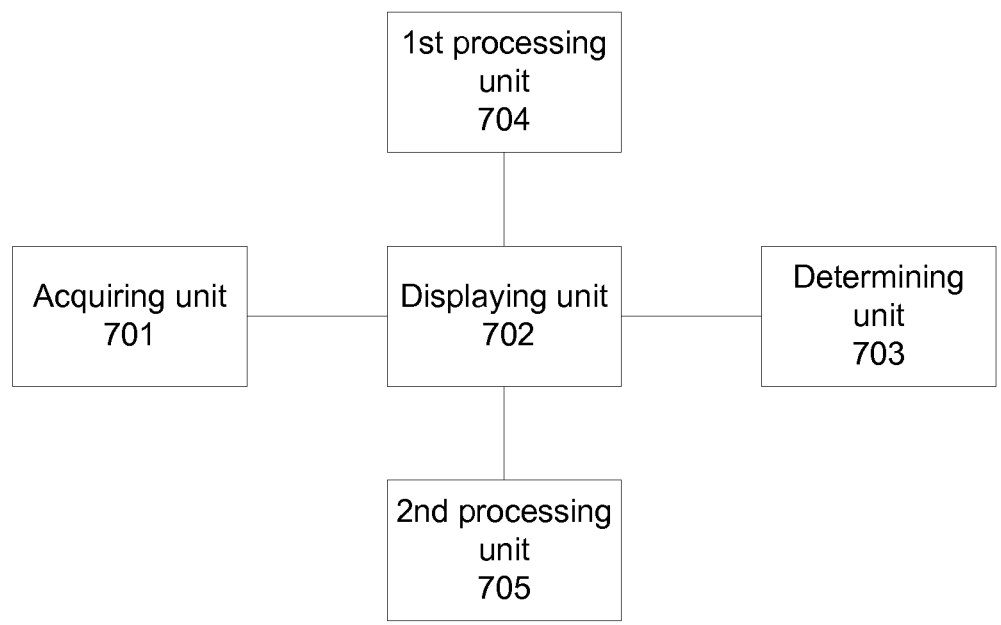
FIG. 8 is a diagram illustrating a second structural composition of an electronic device according to an embodiment of the disclosure.

An embodiment of the disclosure provides another electronic device. FIG. 8 is a diagram illustrating a second structural composition of the electronic device according to an embodiment of the disclosure. As shown in FIG. 8, the electronic device comprises an acquiring unit 701, a first processing unit 704, a second processing unit 705, a displaying unit 702 and a determining unit 703, wherein the acquiring unit 701 is configured to acquire a first file, the first processing unit 704 is configured to perform first process on the first file to obtain a first content, wherein the first content characterizes a first part of a display content of the first file, the second processing unit 705 is configured to perform second process on the first file to obtain a second content, wherein the second content characterizes a second part of the display content of the file, the displaying unit 702 is configured to display the first content, which obtained by the first processing unit 704, in a first region in a first display mode, wherein the first region is a region which allows displaying of the display content of the first file to be triggered when a triggering operation is detected, and the displaying unit 702 is further configured to display the second content, which is obtained by the second processing unit 705, in a second region in a second display mode, wherein the second region is a region which allows displaying of the display content of the first file to be triggered when a triggering operation is detected, the determining unit 703 is configured to determine that a first preset condition is satisfied so as to trigger the displaying unit 702 to switch to the second display mode, wherein the first part is different from the second part, and the first process is different from the second process.

In the embodiment, there is a first relative relationship between the first region and the second region, there is a second relative relationship between the first part and the second part, and the first relative relationship matches with the second relative relationship.

In the embodiment, the first file is image data including multiple frames with display borders. Accordingly, the first content includes X image frames, the second content includes Y image frames, and the ratio between X and Y and the ratio between the first region and the second region have a positive correlation, both X and Y being positive integers.

Alternatively, the first file is image data without frame display border. Accordingly, the ratio between sizes of the first part and the second part and the ratio between the first region and the second region have a positive correlation.

Specifically, the determining unit 703 is configured to determine that the first preset condition is satisfied when a first switching operation is detected, wherein the first switching operation is a switching operation to switch from displaying in the first region to displaying in the second region. Alternatively, the determining unit 703 is configured to determine that the first preset condition is satisfied when a mode switching instruction is detected, wherein the mode switching instruction characterizes switching from a first input mode to a second input mode.

Those skilled in the art should appreciate that the functions of respective processing units in the electronic device according to the embodiment may be understood by referring to related description of the above-described information process method. The processing units in the electronic device according to the embodiment may be implemented by analogous circuits which realize the functions described in the embodiment or by running, on a intelligent terminal, software which realizes the functions described in the embodiment, on a smart terminal.

Eighth Embodiment

An embodiment of the disclosure provides another electronic device. As shown in FIG. 8, the electronic device comprises an acquiring unit 701, a first processing unit 704, a second processing unit 705, a displaying unit 702 and a determining unit 703, wherein the acquiring unit 701 is configured to acquire a first file, the first processing unit 704 is configured to analyze the first file to obtain a first analysis result, determine a first part of a display content of the first file based on the first analysis result, generate a first content based on the first part by applying a first preset process, wherein the first content characterizes the first part of the display content of the first file, the second processing unit 705 is configured to analyze the first file to obtain a second analysis result, determine a second part of the display content of the first file based on the second analysis result, generate a second content based on the second part by applying a second preset process, wherein the second content characterizes the second part of the display content of the first file, the displaying unit 702 is configured to display the first content, which obtained by the first processing unit 704, in a first region in a first display mode, wherein the first region is a region which allows displaying of the display content of the first file to be triggered when a triggering operation is detected, and the displaying unit 702 is further configured to display the second content, which obtained by the second processing unit 705, in a second region in a second display mode, wherein the second region is a region which allows displaying of the display content of the first file to be triggered when a triggering operation is detected, the determining unit 703 is configured to determine that a first preset condition is satisfied so as to trigger the displaying unit 702 to switch to the second display mode, wherein the first part is different from the second part, and the first process is different from the second process.

In the embodiment, there is a first relative relationship between the first region and the second region, there is a second relative relationship between the first part and the second part, and the first relative relationship matches with the second relative relationship.

In the embodiment, the first file is image data including multiple frames with display borders. Accordingly, the first content includes X image frames, the second content includes Y image frames, and the ratio between X and Y and the ratio between the first region and the second region have a positive correlation, both X and Y being positive integers.

Alternatively, the first file is image data without frame display border. Accordingly, the ratio between sizes of the first part and the second part and the ratio between the first region and the second region have a positive correlation.

Specifically, the determining unit 703 is configured to determine that the first preset condition is satisfied when a first switching operation is detected, wherein the first switching operation is a switching operation to switch from displaying in the first region to displaying in the second region. Alternatively, the determining unit 703 is configured to determine that the first preset condition is satisfied when a mode switching instruction is detected, wherein the mode switching instruction characterizes switching from a first input mode to a second input mode.

In the embodiment, the first part comprises X image frames, and accordingly the first processing unit 704 is configured to analyze the first file to obtain the first analysis result, determine based on the first analysis result X image frames in the first file which satisfy the first preset condition, and generate the first content based on the X image frames by applying the first preset process;

The second part comprises Y image frames, and accordingly the second processing unit 705 is configured to analyze the first file to obtain the second analysis result, determine based on the second analysis result Y image frames in the first file which satisfy a second preset condition, and generate the second content based on the Y image frames by applying the second preset process, Both X and Y are positive integers, and X is less than Y.

Those skilled in the art should appreciate that the functions of respective processing units in the electronic device according to the embodiment may be understood by referring to related description of the above-described information process method. The processing units in the electronic device according to the embodiment may be implemented by analogous circuits which realize the functions described in the embodiment or by running, on a intelligent terminal, software which realizes the functions described in the embodiment, on a smart terminal.

Ninth Embodiment

An embodiment of the disclosure provides another electronic device. As shown in FIG. 8, the electronic device comprises an acquiring unit 701, a first processing unit 704, a second processing unit 705, a displaying unit 702 and a determining unit 703, wherein the acquiring unit 701 is configured to acquire a first file, the first processing unit 704 is configured to analyze the first file to obtain a first analysis result, determine based on the first analysis result X image frames which satisfy a first preset condition, and process the X image frames according to a first preset presenting strategy to generate a first content, wherein the first content characterizes a first part of a display content of the first file, the second processing unit 705 is configured to analyze the first file to obtain a second analysis result, obtain P scenes in the first file based on the second analysis result, extract Y scenes from the P scenes, extract one image frame from each of the Y scenes to obtain Y image frames, and process the Y image frames according to a second preset presenting strategy to generate a second content, wherein the second content characterizes a second part of the display content of the first file, wherein both Y and P are positive integers and Y is less than or equal to P, the displaying unit 702 is configured to display the first content, which obtained by the first processing unit 704, in a first region in a first display mode, wherein the first region is a region which allows displaying of the display content of the first file to be triggered when a triggering operation is detected, and the displaying unit 702 is further configured to display the second content, which obtained by the second processing unit 705, in a second region in a second display mode, wherein the second region is a region which allows displaying of the display content of the first file to be triggered when a triggering operation is detected, the determining unit 703 is configured to determine that the first preset condition is satisfied so as to trigger the displaying unit 702 to switch to the second display mode, wherein the first region is smaller than the second region.

In the embodiment, there is a first relative relationship between the first region and the second region, there is a second relative relationship between the first part and the second part, and the first relative relationship matches with the second relative relationship.

In the embodiment, the first file is image data including multiple frames with display borders. Accordingly, the first content includes X image frames, the second content includes Y image frames, and the ratio between X and Y and the ratio between the first region and the second region have a positive correlation, both X and Y being positive integers.

Alternatively, the first file is image data without frame display border. Accordingly, the ratio between sizes of the first part and the second part and the ratio between the first region and the second region have a positive correlation.

Specifically, the determining unit 703 is configured to determine that the first preset condition is satisfied when a first switching operation is detected, wherein the first switching operation is a switching operation to switch from displaying in the first region to displaying in the second region. Alternatively, the determining unit 703 is configured to determine that the first preset condition is satisfied when a mode switching instruction is detected, wherein the mode switching instruction characterizes switching from a first input mode to a second input mode.

Specifically, in the embodiment, the second processing unit 705 processes the Y image frames according to the second preset presenting strategy to generate the second content by: obtaining an attribute parameter for each of the Y image frames; determining, based on the attribute parameter, a first parameter for each of the Y image frames; and stitching together the Y image frames based on their first parameters to generate the second content such that a size and/or a position of each image frame in the second content is associated with the first parameter for that image frame, wherein the first parameter for an image frame characterizes an importance of that image frame in the first file.

Alternatively, the second processing unit 705 processes the Y image frames according to the second preset presenting strategy to generate the second content by: obtaining an attribute parameter for each of the Y image frames; determining, based on the attribute parameter, a first parameter for each of the Y image frames; setting a first time interval based on the first parameter; and animating the Y image frames based on their first time intervals to generate the second content, wherein the first parameter for an image frame characterizes an importance of that image frame in the first file, and the first time interval is a time interval between every two image frames or a time duration for which each image frame stays displayed.

Those skilled in the art should appreciate that the functions of respective processing units in the electronic device according to the embodiment may be understood by referring to related description of the above-described information process method. The processing units in the electronic device according to the embodiment may be implemented by analogous circuits which realize the functions described in the embodiment or by running, on a intelligent terminal, software which realizes the functions described in the embodiment, on a smart terminal.

Tenth Embodiment

An embodiment of the disclosure provides another electronic device. As shown in FIG. 8, the electronic device comprises an acquiring unit 701, a first processing unit 704, a second processing unit 705, a displaying unit 702 and a determining unit 703, wherein the acquiring unit 701 is configured to acquire a first file, the first processing unit 704 is configured to analyze the first file to obtain a first analysis result, determine based on the first analysis result X image frames which satisfy a first preset condition, and process the X image frames according to a first preset presenting strategy to generate a first content, wherein the first content characterizes a first part of a display content of the first file, the second processing unit 705 is configured to analyze the first file to obtain a second analysis result, obtain Y regions in the first file based on the second analysis result, generate one image frame for each of the Y regions to obtain Y image frames, and process the Y image frames according to a second preset presenting strategy to generate a second content, wherein the second content characterizes a second part of the display content of the first file, wherein Y is a positive integer, the displaying unit 702 is configured to display the first content, which obtained by the first processing unit 704, in a first region in a first display mode, wherein the first region is a region which allows displaying of the display content of the first file to be triggered when a triggering operation is detected, and the displaying unit 702 is further configured to display the second content, which obtained by the second processing unit 705, in a second region in a second display mode, wherein the second region is a region which allows displaying of the display content of the first file to be triggered when a triggering operation is detected, the determining unit 703 is configured to determine that the first preset condition is satisfied so as to trigger the displaying unit 702 to switch to the second display mode, wherein the first region is smaller than the second region.

In the embodiment, there is a first relative relationship between the first region and the second region, there is a second relative relationship between the first part and the second part, and the first relative relationship matches with the second relative relationship.

In the embodiment, the first file is image data including multiple frames with display borders. Accordingly, the first content includes X image frames, the second content includes Y image frames, and the ratio between X and Y and the ratio between the first region and the second region have a positive correlation, both X and Y being positive integers.

Alternatively, the first file is image data without frame display border. Accordingly, the ratio between sizes of the first part and the second part and the ratio between the first region and the second region have a positive correlation.

Specifically, the determining unit 703 is configured to determine that the first preset condition is satisfied when a first switching operation is detected, wherein the first switching operation is a switching operation to switch from displaying in the first region to displaying in the second region. Alternatively, the determining unit 703 is configured to determine that the first preset condition is satisfied when a mode switching instruction is detected, wherein the mode switching instruction characterizes switching from a first input mode to a second input mode.

Specifically, in the embodiment, the second processing unit 705 processes the Y image frames according to the second preset presenting strategy to generate the second content by: obtaining an attribute parameter for each of the Y image frames; determining, based on the attribute parameter, a first parameter for each of the Y image frames; and stitching together the Y image frames based on their first parameters to generate the second content such that a size and/or a position of each image frame in the second content is associated with the first parameter for that image frame, wherein the first parameter for an image frame characterizes an importance of that image frame in the first file.

Alternatively, the second processing unit 705 processes the Y image frames according to the second preset presenting strategy to generate the second content by: obtaining an attribute parameter for each of the Y image frames; determining, based on the attribute parameter, a first parameter for each of the Y image frames; setting a first time interval based on the first parameter; and animating the Y image frames based on their first time intervals to generate the second content, wherein the first parameter for an image frame characterizes an importance of that image frame in the first file, and the first time interval is a time interval between every two image frames or a time duration for which each image frame stays displayed.

Those skilled in the art should appreciate that the functions of respective processing units in the electronic device according to the embodiment may be understood by referring to related description of the above-described information process method. The processing units in the electronic device according to the embodiment may be implemented by analogous circuits which realize the functions described in the embodiment or by running, on a intelligent terminal, software which realizes the functions described in the embodiment, on a smart terminal.

In the sixth embodiment to the tenth embodiment, the electronic device in practical applications may be implemented by a tablet computer, a desktop computer, a notebook computer, an ultrabook computer comprising a rotatable screen. In practical applications, all the acquiring unit 701, the determining unit 703, the first processing unit 704 and the second processing unit 705 may be implemented by a Central Processing Unit (CPU), a Digital Signal Processor (DSP) or a Field Programmable Gate Array (FPGA) in the electronic device. The displaying unit 702 in the electronic device may be implemented by a display or screen of the electronic device in practical applications.

As those skilled in the art will appreciate, the embodiments of the disclosure may be provided as methods, systems or computer program products. Thus, the disclosure may be embodied as hardware, software or a combination of software and hardware. In addition, the disclosure may be embodied as computer program products that are implemented on one or more computer-usable storage mediums (including but not limited to magnetic disk storage, optical storage, etc.) containing computer-usable program codes.

The disclosure is described by referring to flowcharts and/or block diagrams of the methods, devices and computer program products according to the embodiments of the disclosure. It shall be understood that each flow and/or block in the flowcharts and/or block diagrams or a combination of flows and/or blocks in the flowcharts and/or block diagrams may be implemented by computer program instructions. These computer program instructions may be provided to a general-purpose computer, a specific-purpose computer, an embedded processor or some other programmable data processing device to create a machine, so that the instructions, which are executed by the processor of the computer or the programmable data processing device, create a device for realizing functions specified in one or more flows in the flowcharts and/or one or more blocks in the block diagrams.

The computer program instructions may also be stored in a computer-readable storage that can direct a computer or some other programmable data processing device to work in a specific manner, so that the instructions stored in the computer-readable storage create an article of manufacture which comprises instruction means for realizing functions specified in one or more flows in the flowcharts and/or one or more blocks in the block diagrams.

The computer program instructions may also be loaded on a computer or some other programmable data processing device, so that a series of operations are executed on the computer or the programmable data processing device to generate computer-implemented processes. As such, the instructions executed on the computer or the programmable data processing device provide steps for realizing functions specified in one or more flows in the flowcharts and/or one or more blocks in the block diagrams.

The foregoing description gives only preferred embodiments of the disclosure and is not intended to limit the scope of the disclosure.

I claim:

1. An information processing method, comprising:
   acquiring a first file;
   displaying a first content in a first region in a first display mode, wherein the first content characterizes a first part of a display content of the first file, and the first region is a region capable of triggering the display content of the first file to be displayed upon a triggering operation for triggering a display is detected; and
   displaying a second content in a second region in a second display mode, if a first preset condition is satisfied, wherein the second content characterizes a second part of the display content of the first file, and the second region is a region capable of triggering the display content of the first file to be displayed upon a triggering operation is detected, wherein the first region is different from the second region.

2. The method according to claim 1, wherein displaying the first content in the first region in the first display mode comprises:
   performing first process on the first file to obtain the first content, and displaying the first content in the first region, and displaying the second content in the second region in the second display mode comprises:
      performing second process on the first file to obtain the second content, and displaying the second content in the second region, wherein the first process is different from the second process.

3. The method according to claim 1, wherein a first relative relationship is defined between the first region and the second region, a second relative relationship is defined between the first part and the second part, and the first relative relationship matches with the second relative relationship.

4. The method according to claim 2, wherein the first content includes X image frames and the second content includes Y image frames, both X and Y being positive integers, if the first region is smaller than the second region, said performing the first process on the first file to obtain the first content comprises:
   analyzing the first file to obtain a first analysis result;
   determining the first part based on the first analysis result; and
   generating the first content based on the first part by applying a first preset process, said performing the second process on the first file to obtain the second content comprises:
   analyzing the first file to obtain a second analysis result;
   determining the second part based on the second analysis result; and
   generating the second content based on the second part by applying a second preset process.

5. The method according to claim 4, wherein the first part includes X image frames, and said determining the first part based on the first analysis result comprises:
- determining, based on the first analysis result, X image frames in the first file which satisfy the first preset condition;
- the second part includes Y image frames, and said determining the second part based on the second analysis result comprises:
  - determining, based on the second analysis result, Y image frames in the first file which satisfy the second preset condition, wherein both X and Y are positive integers and X is less than Y.

6. The method according to claim 5, wherein, if the first file is image data including multiple frames with display borders, said determining, based on the second analysis result, Y image frames in the first file which satisfy the second preset condition comprises:
- obtaining P scenes in the first file based on the second analysis result;
- extracting Y scenes from the P scenes; and
- extracting one image frame from each of the Y scenes to obtain Y image frames, wherein both Y and P are positive integers and Y is less than or equal to P.

7. The method according to claim 5, wherein, if the first file is image data without frame display border, said determining, based on the second analysis result, Y image frames in the first file which satisfy the second preset condition comprises:
- determining Y regions in the first file based on the second analysis result; and
- generating one image frame for each of the Y regions to obtain Y image frames.

8. The method according to claim 4, wherein, if the second part includes Y image frames, said generating the second content based on the second part by applying the second preset process comprises:
- processing the Y image frames according to a preset presenting strategy to obtain the second content.

9. The method according to claim 8, wherein said processing the Y image frames according to the preset presenting strategy to obtain the second content comprises:
- obtaining an attribute parameter for each of the Y image frames;
- determining, based on the attribute parameter, a first parameter for each of the Y image frames; and
- stitching the Y image frames based on the first parameter to generate the second content such that a size and/or a position of each image frame in the second content is associated with the first parameter for each of the Y image frames, wherein the first parameter characterizes importance of an image frame in the first file.

10. The method according to claim 8, wherein said processing the Y image frames according to the preset presenting strategy to generate the second content comprises:
- obtaining an attribute parameter for each of the Y image frames;
- determining, based on the attribute parameter, a first parameter for each of the Y image frames;
- setting a first time interval based on the first parameter; and
- animating the Y image frames based on the first time interval to generate the second content, wherein the first parameter characterizes importance of an image frame in the first file, and wherein the first time interval is a time interval between every two image frames or a time duration for which each image frame being displayed.

11. The method according to claim 1, wherein if the first file is image data including multiple frames with display borders, the first part includes X image frames, the second part includes Y image frames, and a ratio between X and Y and a ratio between the first region and the second region have a positive correlation, wherein both X and Y are positive integers, or if the first file is image data without frame display border, a ratio between sizes of the first part and the second part and a ratio between the first region and the second region have a positive correlation.

12. The method according to claim 1, wherein the first preset condition being satisfied comprises:
- the first preset condition is satisfied if a first switching operation is detected, and wherein the first switching operation is a switching operation to switch from displaying in the first region to displaying in the second region.

13. The method according to claim 1, wherein the first preset condition being satisfied comprises:
- the first preset condition is satisfied when a mode switching instruction is detected, and wherein the mode switching instruction characterizes switching from a first input mode to a second input mode.

14. An electronic device comprising:
- a display unit;
- a processor configured to:
  - acquire a first file;
  - control the display unit to display a first content in a first region in a first display mode, wherein the first content characterizes a first part of a display content of the first file, and the first region is a region capable of triggering the display content of the first file to be displayed upon a triggering operation for triggering a display is detected; and
  - control the display unit to display a second content in a second region in a second display mode if a first preset condition is satisfied, wherein the second content characterizes a second part of the display content of the first file, and the second region is a region capable of triggering the display content of the first file to be displayed upon a triggering operation is detected; wherein the first region is different from the second region.

15. The electronic device according to claim 14, wherein the processor is further configured to:
- perform first process on the first file to obtain the first content; and
- perform second process on the first file to obtain the second content, wherein the first process is different from the second process.

16. The electronic device according to claim 15, wherein the processor is further configured to:
- analyze the first file to obtain a first analysis result, determine the first part based on the first analysis result, and generate the first content based on the first part by applying a first preset process, and analyze the first file to obtain a second analysis result, determine the second part based on the second analysis result, and generate the second content based on the second part by applying a second preset process, wherein the first region is smaller than the second region.

* * * * *